(12) United States Patent
Hall et al.

(10) Patent No.: US 8,301,863 B2
(45) Date of Patent: Oct. 30, 2012

(54) RECURSIVE LOGICAL PARTITION REAL MEMORY MAP

(75) Inventors: William E. Hall, Clinton, CT (US); Guerney D. H. Hunt, Yorktown Heights, NY (US); Paul A. Karger, Chappaqua, NY (US); Mark F. Mergen, Mount Kisco, NY (US); David R. Safford, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 12/272,243

(22) Filed: Nov. 17, 2008

(65) Prior Publication Data

US 2010/0125708 A1    May 20, 2010

(51) Int. Cl.
G06F 12/00    (2006.01)
G06F 9/26    (2006.01)
G06F 9/34    (2006.01)

(52) U.S. Cl. ...................................... 711/202
(58) Field of Classification Search ........................ None
See application file for complete search history.

(56) References Cited

U.S. PATENT DOCUMENTS

| | | | |
|---|---|---|---|
| 4,253,145 A | | 2/1981 | Goldberg |
| 4,456,954 A | | 6/1984 | Bullions, III et al. |
| 5,109,522 A | | 4/1992 | Lent et al. |
| 5,230,069 A | * | 7/1993 | Brelsford et al. ............. 718/100 |
| 5,426,750 A | * | 6/1995 | Becker et al. ................. 711/207 |
| 5,555,385 A | * | 9/1996 | Osisek .............................. 711/1 |
| 7,089,377 B1 | | 8/2006 | Chen |
| 7,409,487 B1 | * | 8/2008 | Chen et al. ........................ 711/6 |
| 2003/0009648 A1 | | 1/2003 | Doing et al. |
| 2004/0205203 A1 | | 10/2004 | Peinado et al. |
| 2005/0071601 A1 | | 3/2005 | Luick |
| 2005/0097298 A1 | | 5/2005 | Cohen |
| 2005/0182912 A1 | | 8/2005 | DeMent et al. |
| 2006/0004944 A1 | | 1/2006 | Vij et al. |
| 2006/0174053 A1 | | 8/2006 | Anderson et al. |
| 2006/0206658 A1 | | 9/2006 | Hendel et al. |
| 2006/0206687 A1 | | 9/2006 | Vega |

(Continued)

FOREIGN PATENT DOCUMENTS

EP    0 303 783 A2    2/1989

(Continued)

OTHER PUBLICATIONS

U.S. Appl. No. 12/272,261.

(Continued)

*Primary Examiner* — Kevin Ellis
*Assistant Examiner* — Gary W Cygiel
(74) *Attorney, Agent, or Firm* — Stephen J. Walder, Jr.; Preston J. Young

(57) ABSTRACT

A recursive logical partition real memory map mechanism is provided for use in address translation. The mechanism, which is provided in a data processing system, receives a first address based on an address submitted from a process of a currently active logical partition. The first address is translated into a second address using a recursive logical partition real memory (RLPRM) map data structure for the currently active logical partition. The memory is accessed using the second address. The RLPRM map data structure provides a plurality of translation table pointers, each translation table pointer pointing to a separate page table for a separate level of virtualization in the data processing system with the data processing system supporting multiple levels of virtualization.

18 Claims, 10 Drawing Sheets

U.S. PATENT DOCUMENTS

| | | | |
|---|---|---|---|
| 2006/0259732 A1 | 11/2006 | Traut et al. |
| 2006/0259734 A1 | 11/2006 | Sheu et al. |
| 2006/0259818 A1 | 11/2006 | Howell et al. |
| 2007/0008324 A1 | 1/2007 | Green |
| 2007/0016755 A1 | 1/2007 | Pratt |
| 2008/0168254 A1 | 7/2008 | Corrigan et al. |
| 2009/0113164 A1 | 4/2009 | Rajamony et al. |
| 2009/0198953 A1 | 8/2009 | Arimilli et al. |
| 2010/0125709 A1 | 5/2010 | Hall et al. |

FOREIGN PATENT DOCUMENTS

| | | |
|---|---|---|
| EP | 0 303 783 B1 | 4/1994 |
| EP | 1 528 474 A2 | 5/2005 |
| EP | 1 701 268 A2 | 9/2006 |

OTHER PUBLICATIONS

U.S. Appl. No. 12/272,261, filed Nov. 17, 2008, Hall, William E., et al.

"IBM Virtual Machine Facility/370: Data Areas and Control Block Logic, Release 3, PLC1", IBM Corporation, File No. S370-36, Order No. SY20-0884-0, Feb. 1976, 317 pages.

"IBM Virtual Machine Facility/370: System Logic and Problem Determination Guide vol. 1", IBM Corporation, File No. S370-36, Order No. SY20-0886-1, Mar. 1979, 455 pages (7 pages submitted herewith).

"Power ISA™ Version 2.05", Book III-S: Power ISA Operating Environment Architecture—Server Environment, Sections 5.7.5 through 5.7.7.3, IBM Corporation, Oct. 23, 2007, http://www.power.org/resources/reading/PowerISA_V2.05.pdf, 12 pages.

"Power.org™ Standard for Power Architecture™ Platform Requirements (Workstation, Server)", Version 2.0, Section 14.5.4.1, Power.org, Aug. 28, 2006, http://power.org/members/developers/specs/PAPR_Version_2.0_28August06.pdf, 96 pages.

Barham, Paul et al., "Xen and the Art of Virtualization", Proceedings of the Nineteenth ACM Symposium on Operating Systems Principles (SOSP), Oct. 19-22, 2003, http://www.cl.cam.ac.uk/Research/SRG/netos/papers/2003-xensosp.pdf, 14 pages.

Goldberg, Robert P., "Architectural Principles for Virtual Computer Systems", Ph.D. Thesis in Division of Engineering and Applied Physics, Feb. 1973, Harvard University: Cambridge, MA. Published as ESD-TR-73-105. HQ Electronics Systems Division, Hanscom AFB, MA, 249 pages.

Notice of Allowance mailed Oct. 21, 2011 for U.S. Appl. No. 12/272,261; 10 pages.

* cited by examiner

RECURSIVE LOGICAL PARTITION REAL MEMORY MAP

BACKGROUND

The present application relates generally to an improved data processing apparatus and method and more specifically to mechanisms for providing a recursive logical partition real memory map.

Contemporary technology enables economical fabrication of computer systems with generous complements of resources, including multiple processors, large primary fast memory, very large secondary storage, and many I/O devices. The concepts of virtualization and logical partitioning have been developed to efficiently use these systems for workloads of widely varying capacity and schedule demands. The total system resources are divided among a number of logical partitions, sometimes called virtual machines because each can operate autonomously as if it were a separate hardware system of smaller capacity. The number of partitions and the amount of resources assigned to each may vary widely and may be changed dynamically to match the needs of different independent workloads and to accommodate their time-varying demands. Usually, processors may be dynamically switched between partitions at millisecond intervals. However, primary memory and secondary storage may require longer intervals for reallocation between partitions, yet these longer intervals are still quite adequate to respond to daily and time-zone scheduling variations. Each partition usually runs a full software stack, such as an operating system, middleware, and related applications, as would run on an independent system.

The system component that manages logical partitioning is a combination of hardware and software referred to as a "hypervisor." The hypervisor creates logical partitions, assigns resources to them, enforces resource separation and authorized sharing between the logical partitions, and dynamically alters resource assignments to the logical partitions in response to demands of the independent partition workloads and overall system performance goals. This core resource allocation function is necessarily the most privileged function in the overall system and is therefore part of the Reference Monitor component in systems that implement the Multi-Level Security models established by government and industry standards.

The historical approach to separation of real memory into partitions is called full virtualization of address translation and partition memory. The hypervisor is given exclusive control of the virtual address translation features of the system hardware, by running all logical partition (LPAR) software, including the OS, in a non-privileged state. Each LPAR OS is given an allocation of real memory which it may treat as a single block of apparent real addresses beginning at zero. The hypervisor keeps a real memory map that records which blocks of real memory are actually allocated to each LPAR. The LPAR OS controls the assignment of real memory pages to virtual addresses and stores these assignments in its page table, just as it would do if running on its own real hardware instead of in a LPAR (virtual machine) provided by the hypervisor.

However, the OS cannot install its page table for the hardware to use because the privileged operation to do this causes an interrupt to the hypervisor. When this occurs, the hypervisor remembers the address of the OS's page table and instead installs a hypervisor page table for the hardware. When a page fault occurs, the hypervisor receives the interrupt and looks in the OS's page table for a translation of the faulting virtual address. If one is found, the hypervisor uses its real memory map to translate the apparent real address from the OS's page table to an actual real address in a block of real memory allocated to the LPAR, stores this virtual-to-real translation in the hypervisor's page table used by the hardware, and resumes the page-faulting operation. If no translation is found in the OS's page table, the page fault interrupt is passed to the OS. After the OS assigns a real page to the virtual address in its page table, the above process is repeated to resolve the fault. If the OS needs to disable virtual address translation and directly address its apparent real memory, for example to receive an interrupt in some architectures, the hypervisor prevents this but instead installs another page table that translates LPAR apparent real addresses directly to actual real addresses allocated to the LPAR, thereby simulating real addressing mode.

Paravirtualization is an alternative to full virtualization that was developed to avoid some of the latter's overheads, such as simulation of privileged operations and real addressing mode, passing interrupts, maintaining multiple page tables, and sometimes needing multiple page faults to resolve one virtual translation. With paravirtualization, the OS runs in a mostly-privileged state and receives page fault interrupts directly from the hardware. A hardware register is provided to hold the actual real address of the one real memory block allocated to the LPAR for apparent real address zero. This is used when virtual address translation is disabled because the OS receives an interrupt, to avoid simulation of real addressing mode. The hypervisor runs in the most-privileged state and retains exclusive control of the page table used by the hardware, as with full virtualization. To resolve a page fault, the LPAR OS assigns an apparent real page to the faulting virtual address, just as it would for full virtualization or when running on its own real hardware. However, instead of storing this translation in its own page table, which the hardware cannot use, the LPAR OS calls the hypervisor, passing the virtual-to-real translation as a parameter. The hypervisor, using its real memory map, translates the apparent real address to an actual real address and stores the virtual-to-real translation in the hypervisor's page table used by the hardware, as with full virtualization. This avoids multiple tables and faults.

Although paravirtualization offers better performance than full virtualization, it requires significant OS changes and calls to the hypervisor to resolve page faults. In addition, the security of real memory separation of LPARs depends not only on the correctness of the hypervisor in allocating real memory to LPARs but also, for both para- and full virtualization, in maintaining the page table used by the hardware, in translating apparent real addresses to actual real addresses using its real memory map, and, for full virtualization, in interpreting the OS's page table.

SUMMARY

A recursive logical partition real memory map mechanism is provided for use in address translation. In one illustrative embodiment, a method, in a data processing system, is provided for accessing memory based on an address submitted by a process of a currently active logical partition. The method comprises receiving a first address based on an address submitted from the process of the currently active logical partition. The first address is translated into a second address using a recursive logical partition real memory (RLPRM) map data structure for the currently active logical partition. The memory is accessed using the second address. The RLPRM map data structure provides a plurality of translation table pointers, each translation table pointer pointing to a separate page table for a separate level of virtualization in the data processing system with the data processing system supporting multiple levels of virtualization.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
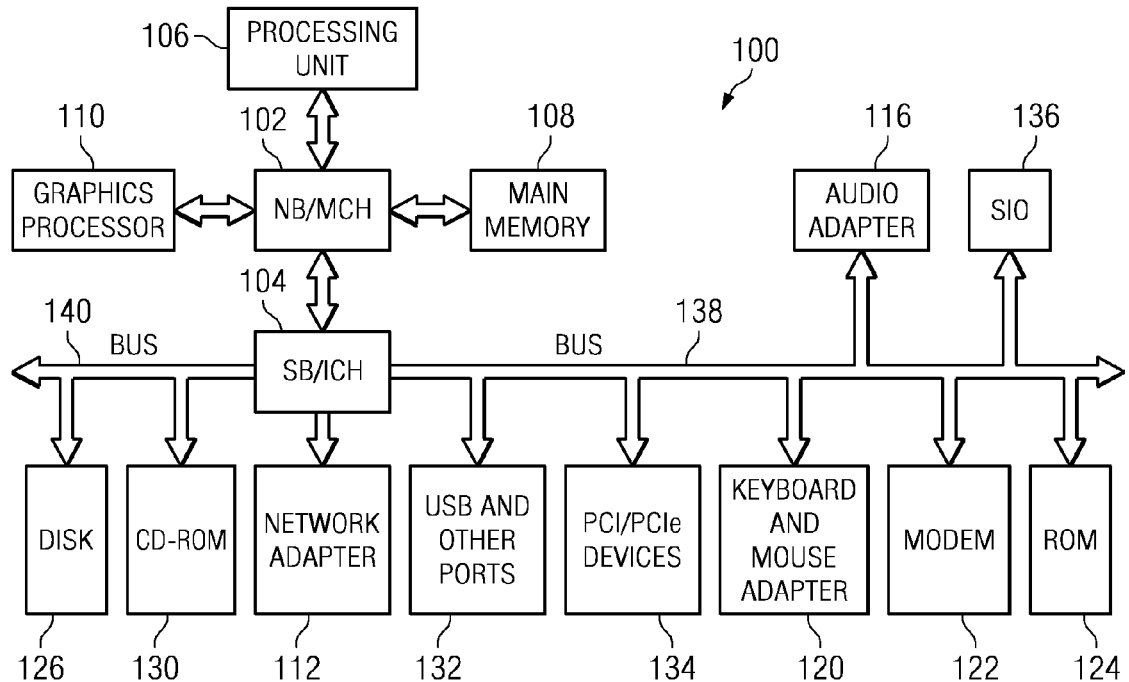
FIG. 1 is an example diagram of a data processing system in which exemplary aspects of the illustrative embodiments may be implemented.

The illustrative embodiments provide a mechanism for the hypervisor's assignment of primary fast real memory to logical partitions, including enforcement of real memory separation between partitions while allowing authorized sharing of memory. Moreover, the illustrative embodiments provide an architecture for the hypervisor real memory map that is used directly by the hardware and that avoids the OS changes and calls to the hypervisor of paravirtualization. The architecture further reduces the size of the hypervisor core function whose correctness determines the security of real memory separation of partitions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit,". "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages, or even or lower level languages such as assembler or microcode. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an exemplary data processing environment in which exemplary aspects of the illustrative embodiments may be implemented. It should be appreciated that FIG. 1 is only exemplary and is not intended to assert or imply any limitation with regard to the data processing environments in which aspects of the illustrative embodiments may be implemented. Many modifications to the depicted data processing environment may be made without departing from the spirit and scope of the present invention.

With reference now to the figures, FIG. 1 is a block diagram of an exemplary data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 204 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 2:
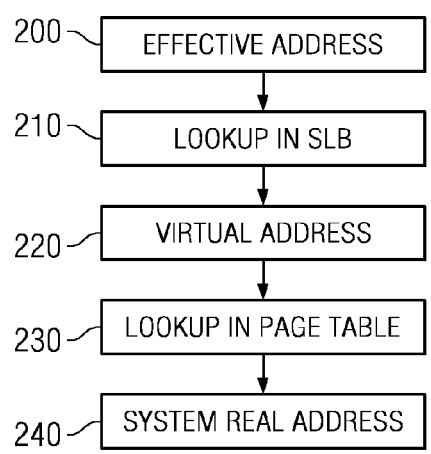
FIG. 2 is an example diagram illustrating a known method of address translation.

FIG. 2 is an overview of address translation as it exists in the art today. As shown in FIG. 2, the effective address (EA) 200 is the address generated by a processor for an instruction fetch or for a data access. If address translation is enabled, this address is passed to an address translation mechanism which converts the effective address to a real address. The real address is then used to access memory. With regard to FIG. 2, this translation operation is shown in terms of the Power PC architecture available from International Business Machines Corporation of Armonk, N.Y. It should be appreciated that while a Power PC architecture is used for exemplary purposes, the depicted address translation mechanism may be applied to any architecture.

As shown in FIG. 2, the first step is to take the EA 200 and generate a virtual address (VA) 220 by performing a lookup operation in a segment look-aside buffer (SLB) 210. The next step is to generate a real address (RA) 240 by performing a lookup operation of the virtual address 220 in the page tables 230. The real address 240 is then used to access memory. It is well known that there can be faults in this process that have to be corrected by a combination of hardware and software.

Figure 3:
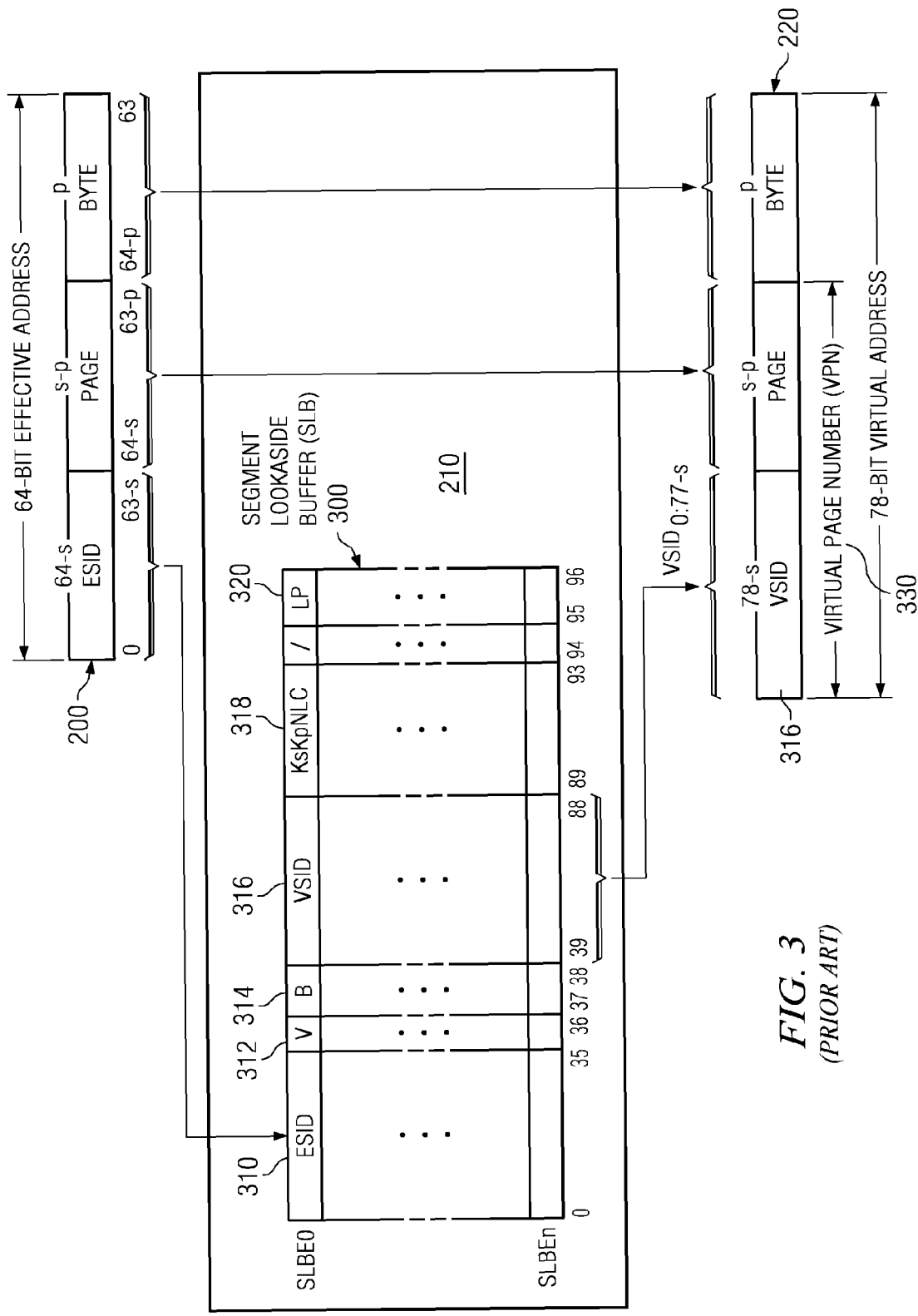
FIGS. 3 and 4 provide an example diagram illustrating a known translation method for translating an effective address into a virtual address.
Figure 4:
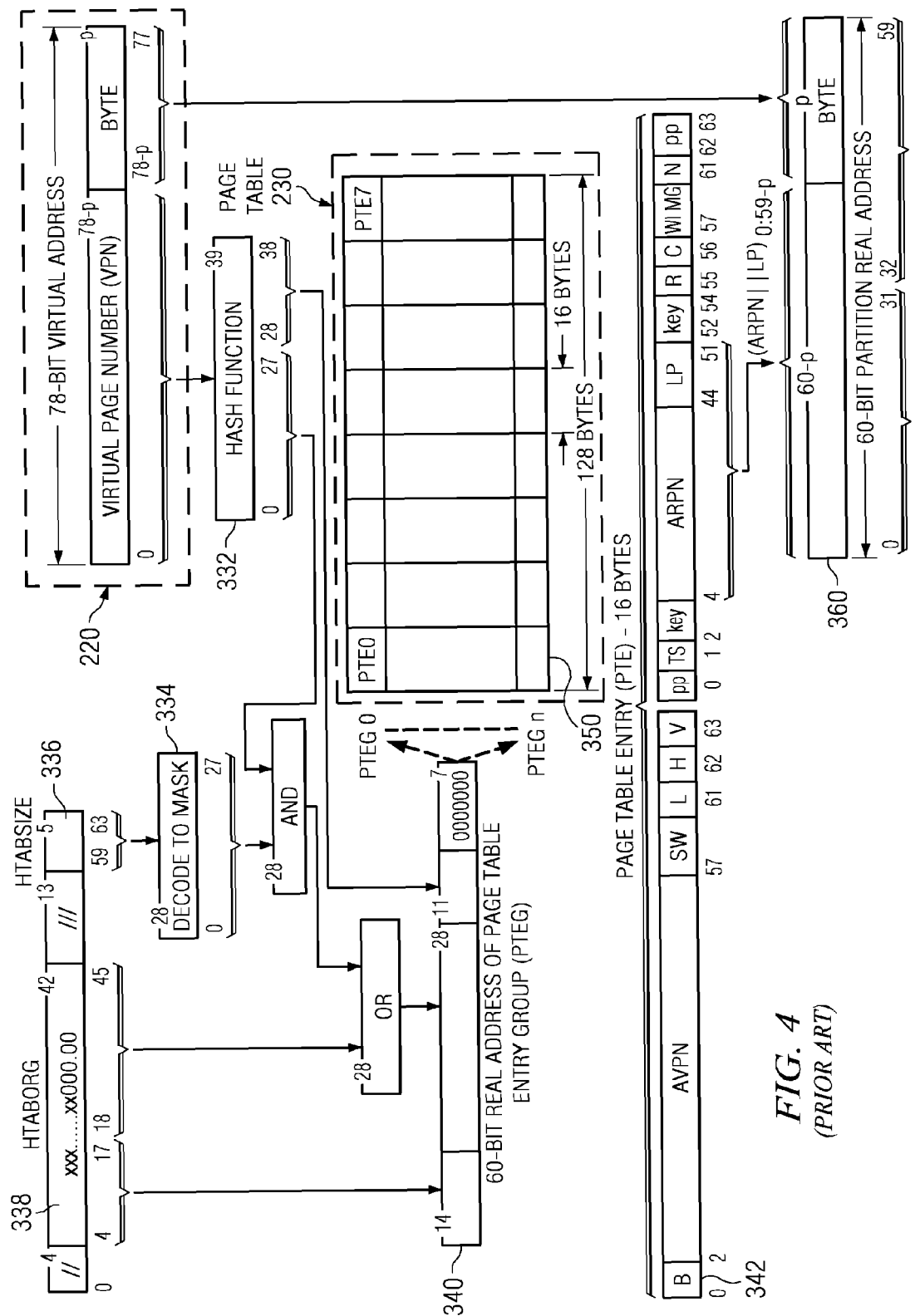

FIGS. 3-4 provide another illustration of an address translation as it exists in the art today. As shown in FIG. 3, the first step is to take an effective address 200 and look it up in the segment look-aside buffer (SLB) 210 which produces a virtual address 220. The SLB 210 specifies the mapping between effective segment identifiers (ESIDs) and virtual segment identifiers (VSIDs). Each SLB entry maps one ESID to one VSID. As shown in FIG. 3, the SLB entry 300 includes an ESID 310, a valid bit 312, a segment size selector 314, a virtual segment identifier (VSID) 316, an entry portion 318 having a supervisor state storage key (Ks), a problem state storage key (Kp), a no-execute segment (N), a virtual page size selector bit 0 (L), and a class (C), and a virtual page size selector bits 1:2 (LP) 320.

As shown in FIG. 3, the effective address 200 includes an ESID which is translated by the SLB entry 300 into a corresponding VSID 316 which is output by the SLB 210 as part of the virtual address 220. The page identifier and byte identifier from the effective address 200 are output as part of the virtual address 220. The VSID 316 and page identifier together form a virtual page number (VPN) 330 which, as shown in FIG. 4, is then input to a hash function 332 in order to generate a hash value. The first 28 bits of the hash value output by the hash function 332 are AND'd with a "decode to mask" value 334 generated based on the page table size (HTABSIZE) 336 obtained from a storage description register. The output of the AND function is OR'd with a real address of the page table (HTABORG) 338 obtained from the storage description register. A combination of the real address of the page table, the result of the OR operation, and bits 28 to 38 of the hash value generated by the hash function 332 is output as the real address of the page table entry group (PTEG) 340.

The real address of the PTEG 340 selects a PTEG from the page table 350 containing 8 page table entries (PTEs). One PTE 342 is selected if its abbreviated virtual page number (AVPN) field matches the upper 55 bits of the VPN field of the virtual address 220. The abbreviated real page number (ARPN) and large page (LP) fields of this PTE 342 are then concatenated with the byte address from the virtual address 220 to generate a system real address 360. This system real address 360 is then used to access a corresponding portion of memory. For more details of this known translation mechanism, reference is made to the Power Instruction Set Architecture (ISA).

The mechanisms of address translation shown in FIGS. 3-4 can be used to achieve an environment of virtual machines with multiple logical partitions, using the techniques of full virtualization or paravirtualization as previously described. However, these approaches have significant drawbacks that may reduce system performance and/or increase the difficulty of maintaining system correctness and security. With full virtualization, the hypervisor must simulate privileged operations, correctly interpret the operating system's page tables, maintain multiple hypervisor page tables, reflect some interrupts it receives to the operating system, and sometimes cause multiple interrupts for a single page fault. With paravirtualization, the operating system must be significantly modified and often two versions of the operating system must be maintained in parallel, so that it can be used either (1) directly on a machine or fully-virtualized virtual machine, or (2) in a virtual machine provided by a hypervisor that uses paravirtualization. With both approaches, the security of real memory separation of partitions depends on the hypervisor correctly translating partition apparent real addresses to actual system real addresses and correctly maintaining the resulting virtual-to-real translations in the hypervisor page tables used by the hardware.

In the illustrative embodiments of the present invention, the mechanisms described above with regard to FIGS. 3-4 are unchanged except for the software program allowed to use the mechanisms and the naming of the result. However, with the illustrative embodiments of the present invention, another address translation mechanism, specifically configured for the usual practice of modern hypervisors in allocating real memory to logical partitions, is added to the hardware to replace most of the actions required of hypervisor software in address translation and partition real memory separation.

This additional mechanism removes the drawbacks listed above that occur when existing art is used for full virtualization or paravirtualization, with resulting improvement in system performance, correctness, and security. The operating system (OS) does not need to be modified from that which runs directly on a real machine. The tables constructed by the OS, described above with regard to FIGS. 3-4, may now be used directly by the hardware for translation using the mechanisms of the illustrative embodiments.

The hypervisor does not have control of the page table and no interrupt occurs when the OS loads the HTABORG 338 and HTABSIZE 336 fields of the storage description register to identify this table, as required by the described existing art for virtual machines. The hypervisor does not simulate OS privileged operations, interpret OS page tables, maintain hypervisor page tables, reflect interrupts to the OS, or translate partition apparent real addresses to actual system real addresses. Instead, the hypervisor only needs to perform its irreducible function of allocating real memory to the several logical partitions, usually in very large blocks, and store the system real addresses and sizes of the allocated blocks in a new table added by the illustrative embodiments, referred to as the logical partition real memory map. Once these hypervisor allocations are stored in the logical partition real memory map, which occurs mostly when the partition is first setup and is a low-frequency event, the translation from virtual address to system real address takes place entirely within hardware and not in the hypervisor software. If a page fault occurs, the interrupt goes directly to the OS and the OS resolves the fault by modifying its page table, to be used directly by the hardware.

The result of translation by the page table is renamed to be the partition real address instead of system real address. This partition real address is further translated into a system real address by the hardware, using the logical partition real memory map, as will be described. Since this new mechanism controls all system real addresses used to address memory, and since it is accessible only to the hypervisor, the guest OS's in different logical partitions are unaware of its existence and cannot violate the separation of real memory allocation to partitions determined by the hypervisor, even though they can store any partition real addresses in their page tables.

Figures 5, 5A:
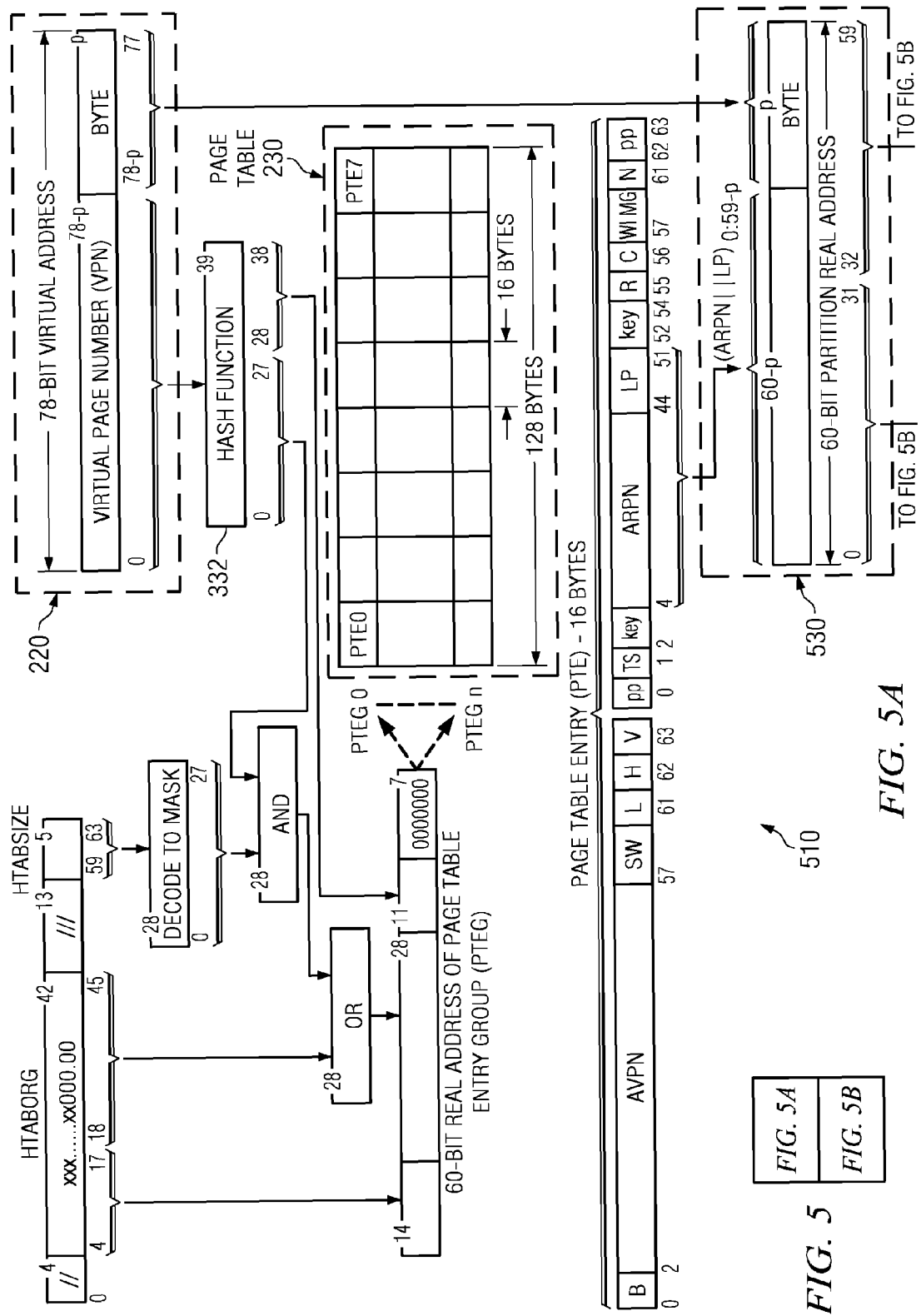
FIG. 5 is an example diagram outlining a translation method in accordance with one illustrative embodiment.
Figure 5B:
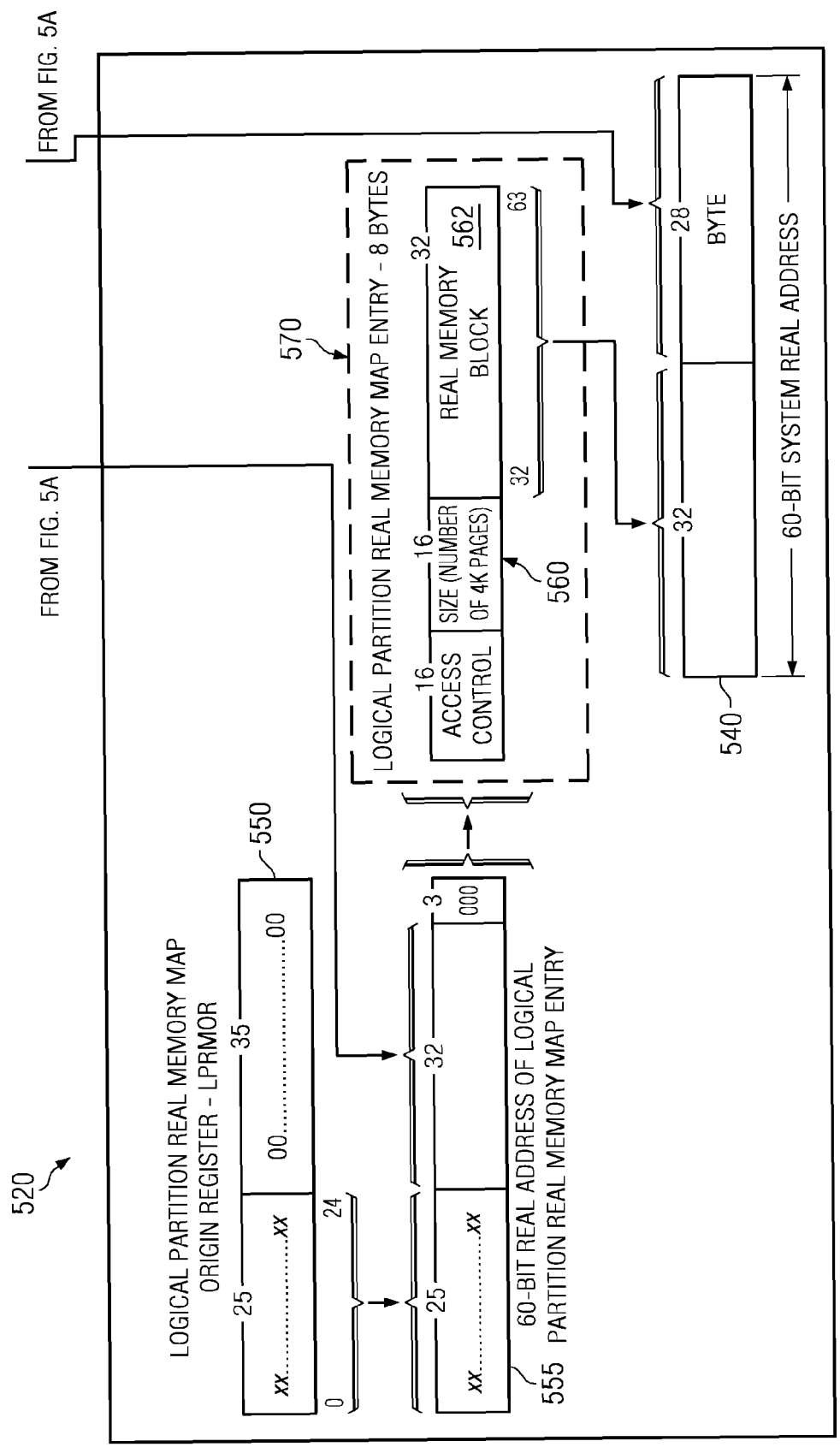

FIG. 5 is an exemplary diagram outlining a translation method in accordance with one illustrative embodiment of the present invention. The method shown in FIG. 5 is shown in association with the hardware elements, of one illustrative embodiment, used to implement the method, e.g., the registers, logic units, and the like. For example, with one illustrative embodiment, arrowed lines in FIG. 5 represent hardware implemented signal lines which are used to transmit bit values between the elements depicted. Unless otherwise indicated, elements depicted as storing bit values are registers or other storage devices implemented in hardware of a processor of a data processing system. It should be noted, however, as discussed previously, that in some illustrative embodiments the various operations of the methods may be implemented as computer instructions executed by a processor. For purposes of the depicted example, however, it will be assumed that the operations are implemented in hardware.

As shown in FIG. 5, the first portion of the diagram 510 corresponds to the operation outlined with regard to FIGS. 3-4. The main exception is that the resulting address generated by this operation is a partition real address 530, rather than a system real address, since the partition real address 530 represents a "real address" from the view point of the logical partition but does not represent the actual real address for accessing memory.

As shown in FIG. 5, in a second portion of the diagram 520, a logical partition real memory map is used along with the partition real address 530 to obtain the system real address 240 that is ultimately used to access real memory allocated to the partition. As shown in FIG. 5, the data processing system in which the elements of FIG. 5 are implemented may support a plurality of different logical partition real memory maps, one for each logical partition currently present in the data processing system. An address value for the particular logical partition real memory map for the currently active logical partition is loaded into the logical partition real memory map origin register (LPRMOR) 550 by the hypervisor when there is a switch to that particular logical partition by the processor hardware. Thus, the LPRMOR 550 may have different values depending upon which logical partition is currently attempting to access memory, i.e. the currently active logical partition.

The address value in the LPRMOR 550 is used with the partition real address 530 to generate a real address 555 of a logical partition real memory map entry 560 in the logical partition real memory map 570. In particular, the partition real address 530 is divided into two parts. The high order part, which in the depicted example is bits 0-31 of the partition real address 530, is the index into the logical partition real memory map 570. The low order part, which in the depicted example is bits 32-59 of the partition real address 530, becomes the low order bits of the system real address. While particular bits are shown as being part of the high order bits and low order bits in accordance with the PowerPC architecture, it should be appreciated that this is only exemplary. The key concept here is that the partition real address 530 is divided into low and high order parts in a manner that is consistent with the address translation of the particular architecture in which the illustrative embodiments are implemented.

As further shown in FIG. 5, the first 25 bits of the address value in the LPRMOR 550, which points to the base address of the logical partition real memory map table 570, is combined with the high order bits of the partition real address 530, followed by three zero bits to complete a 60 bit address, to generate a real address 555 of a logical partition real memory map entry 560. The entry 560 includes a real memory block field 562 which is combined with the low-order 28 bits of the partition real address 530 to generate a system real address 540. The system real address 540 is output for use in accessing real memory.

In the depicted illustrative embodiment, each logical partition real memory map entry 560 in the logical partition real memory map table 570 contains two bytes of access control, which is defined in a way that is consistent with access control in the architecture where the illustrative embodiment is implemented. Each logical partition real memory map entry 560 also contains a two-byte size field that defines the size of the real memory block allocated to the partition and addressed by the real memory block field 562. As depicted, the value in the size field is the number of 4K pages in the real memory block. This acts as a limit on the maximum value of the 28-bit byte address field that comes from the partition real address 530 and goes into the system real address 540. If the upper 16-bits of the 28-bit byte address field of the system real address 540 are greater than the size field of the logical partition real memory map entry 560 used for the translation, then the memory access is not allowed by the hardware. As an alternative, the size may be a fixed set where each member is represented by a specific value in this field. Any method known in the art can be used to encode the size field in the logical partition real memory map entry 560 without departing from the spirit and scope of the illustrative embodiments.

Those of ordinary skill in the art realize that the size of the table entries and the partitioning of the addresses must be done in a manner that is consistent with the architecture where the illustrative embodiments are implemented. Further the size of the logical partition real memory map entry may vary depending upon the particular architecture in which the illustrative embodiments are implemented. However, it should be appreciated that the number of bits used to generate the address of the entry should be maintained consistent with the size of each entry.

Figure 6:
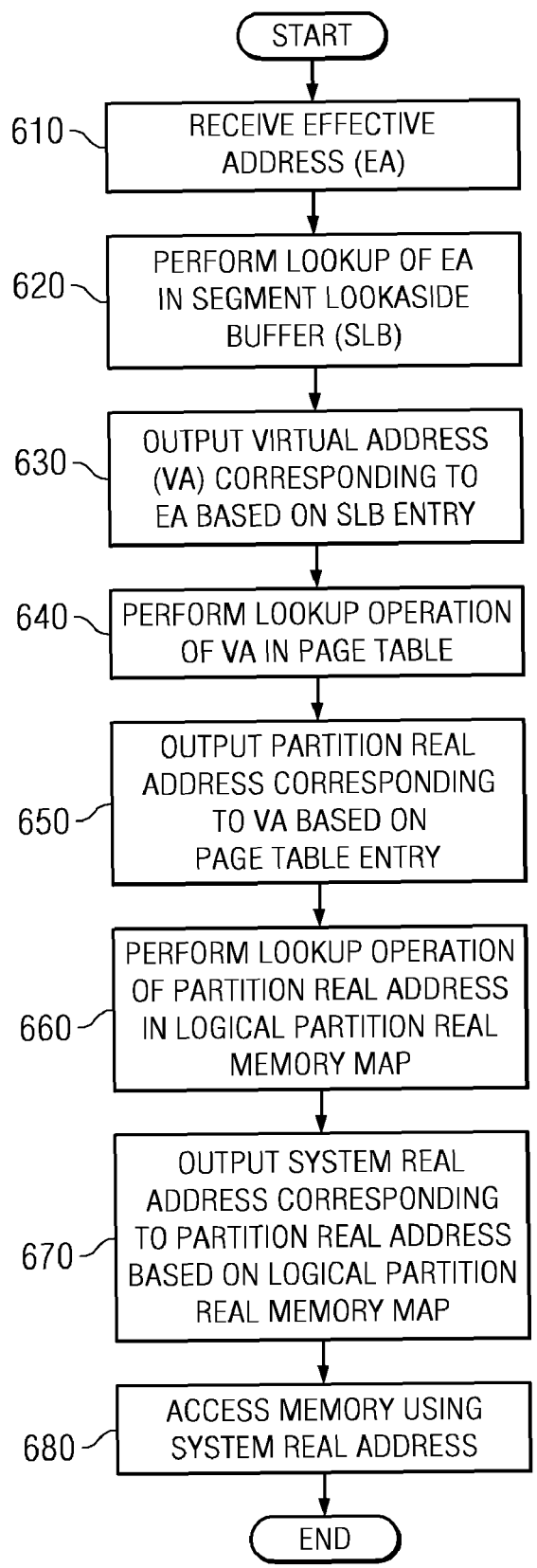
FIG. 6 is a flowchart outlining a translation operation in accordance with the mechanisms of one illustrative embodiment.

FIG. 6 is a flowchart outlining a translation operation in accordance with the mechanisms of one illustrative embodiment. As shown in FIG. 6, the translation operation starts with receiving an effective address that is to be translated (step 610). The effective address is used to perform a lookup operation in a segment lookaside buffer (SLB) (step 620) to generate a virtual address corresponding to the effective address (step 630). The virtual address is used to perform a lookup operation in a page table (step 640) to generate a partition real address corresponding to the virtual address (step 650). The partition real address is used to perform a lookup operation in a logical partition real memory map (step 660) to generate a system real address corresponding to the partition real address (step 670). The system real address is then used to access a portion of memory allocated to the partition (step 680). The operation then terminates.

The mechanisms described above are primarily directed to use with a single level of virtualization in hardware. In order to support multiple levels of virtualization, the additional levels of virtualization beyond the single first level of virtualization supported by the hardware described above may be implemented in additional mechanisms provided by further illustrative embodiments described hereafter. Such additional mechanisms, may be implemented in hardware mechanisms, software mechanisms, or a combination of hardware and software. One illustrative embodiment may implement these additional mechanisms in software where there is no or little support in the hardware translation mechanisms for these additional multiple levels of virtualization. It should be appreciated that these additional mechanisms may be used in conjunction with the hardware mechanisms described previously.

Figure 7:
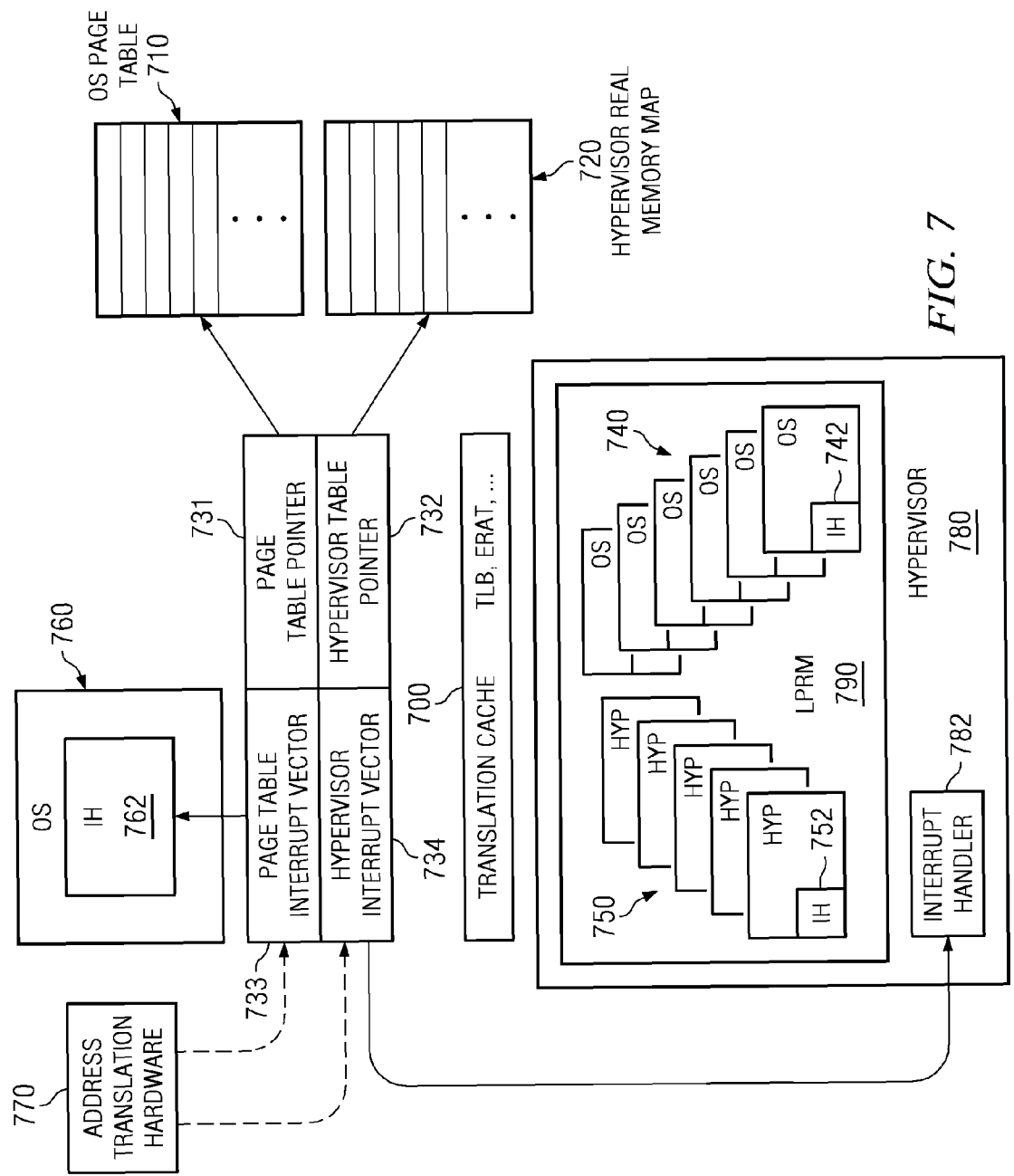
FIG. 7 is an example diagram illustrating a mechanism for performing address translation with a single level of virtualization in accordance with one illustrative embodiment.

FIG. 7 is an example diagram illustrating a mechanism for performing address translation with a single level of virtualization in accordance with one illustrative embodiment. It should be noted that the system in which address translation is performed may or may not have a translation cache 700 such as a translation look-aside buffer (TLB), effective to real address translation (ERAT) device, or some other mechanism for storing translations of virtual addresses to real addresses. The presence or absence of these mechanisms to speed up address translation do not affect the underlying mechanisms of the illustrative embodiments, other than to potentially increase the speed by which translations may be performed, and thus will not be discussed in detail hereafter.

Referring to FIG. 7, for purposes of address translation, the address translation hardware 770 looks up the virtual address in the active OS page table 710. If the virtual address is not found in the active OS page table 710, the address translation hardware presents a page table interrupt (as indicated by the dashed line in FIG. 7) to the active page table interrupt handler 762 in the corresponding active OS 760. When the OS page table interrupt handler 762 has resolved the address and fixed up the OS page tables 710, it returns to the address translation hardware. The address translation restarts and will retrieve an effective address out of the active OS page table 710 based on the virtual address. The address translation hardware next looks up the effective address in the active hypervisor real memory map 720, in order to generate a real memory address. If the effective address is not in the hypervisor real memory map 720, the address translation hardware presents an address translation interrupt (as indicated by the dashed lines in FIG. 7) to the interrupt handler 782 of the active hypervisor 780 pointed to by the interrupt vector 734. After the hypervisor interrupt handler 782 resolves the translation and updates the hypervisor memory map, it returns to the address translation hardware 770, the translation restarts and the translation completes successfully.

A Logical Partition Real Memory (LPRM) map 790 provides hardware support to hypervisors 780 for managing multiple operating systems 760. In order to provide such a LPRM, the hypervisor 780 keeps a hypervisor real memory map table 750, which is a set of hypervisor tables, and a page table 740, which is a set of operating system tables, for each active operating system being managed. The page table interrupt handler address, IH 742, for each managed operating system OS 760, is kept by the hypervisor 780 along with the interrupt handler address, IH 752, for each set of hypervisor tables 750. The hypervisor real memory map table 750 contains the translation information for the particular hypervisor, and all of the memory allocated to the operating system, with which this table 750 corresponds. In the one illustrative embodiment, the hypervisor memory and interrupt handler may use a single hypervisor table 752 for each of the operating systems under management and thus, there is only one hypervisor table 752. However, it should be appreciated that this is not required and multiple handlers and tables may be used, each being for one or more operating systems under management, without departing from the spirit and scope of the illustrative embodiments. Utilizing this mechanism, with careful engineering one may have different hypervisors, or different versions of the same hypervisor, managing different operating systems as illustrated in FIG. 7 with multiple hypervisor tables 750.

This architecture utilizes a context switch mechanism in the hypervisor that includes five steps: 1) changing the page table pointer 731 for the active OS; 2) changing the page table interrupt vector 733; 3) changing the hypervisor real memory map 732; 4) changing the corresponding hypervisor interrupt vector 734; and 5) possibly flushing some or all of the translation cache 700 if present in the system. In the case where there is only one hypervisor, steps 3 and 4 of the context switch mechanism are not required. One mechanism for speeding up the context switch time in the case where there is a single hypervisor is to utilize a single Hypervisor Real Memory Map table 720. In order to do this, the hardware is informed of which operating system was active so that it could correctly use the Real Memory Map table 720 to translate effective addresses from the operating system page tables into real memory addresses. If the translation cache 700 is tagged indicating whether the entry is associated with the hypervisor or the OS, then assuming that there is only one hypervisor, only the OS entries in the translation cache 700 need to be flushed.

This architecture for a real memory map used directly by hardware enables other small changes in hardware architecture and significant improvements for system software. The hypervisor no longer needs exclusive control of virtual address translation hardware. The OS does not need to modify its page fault handling to call the hypervisor (paravirtualiztion) for page table updates. The OS's page table is used directly by the hardware, as when running on a real hardware system without a hypervisor. When a virtual-to-real translation is loaded into the translation lookaside buffer (TLB), from the OS's page table by the hardware, or by the OS itself if the architecture requires or allows this, the hardware first translates the apparent partition real address from the OS to an actual real address, using the Logical Partition Real Memory (LPRM) map. If the architecture allows reading the translation lookaside buffer (TLB), the apparent real address must be returned, rather than the actual real address, to avoid security issues. The Logical Partition Real Memory (LPRM) map 790 is also used for real addressing mode when the partition receives interrupts, and for I/O operations that reference partition memory using apparent real addresses. With this architecture, the security of real memory separation of partitions depends only on the correctness of the hypervisor in allocating real memory blocks to partitions, storing those allocations in each partition's map, and switching the map registers when assigning a processor to a partition.

As was pointed out previously, the Logical Partition Real Memory (LPRM) map provides a single level of hardware support for full virtualization. Additional mechanisms are provided by the illustrative embodiments to provide hardware and/or software support for an arbitrary number of levels of nested virtualization.

Figure 8:
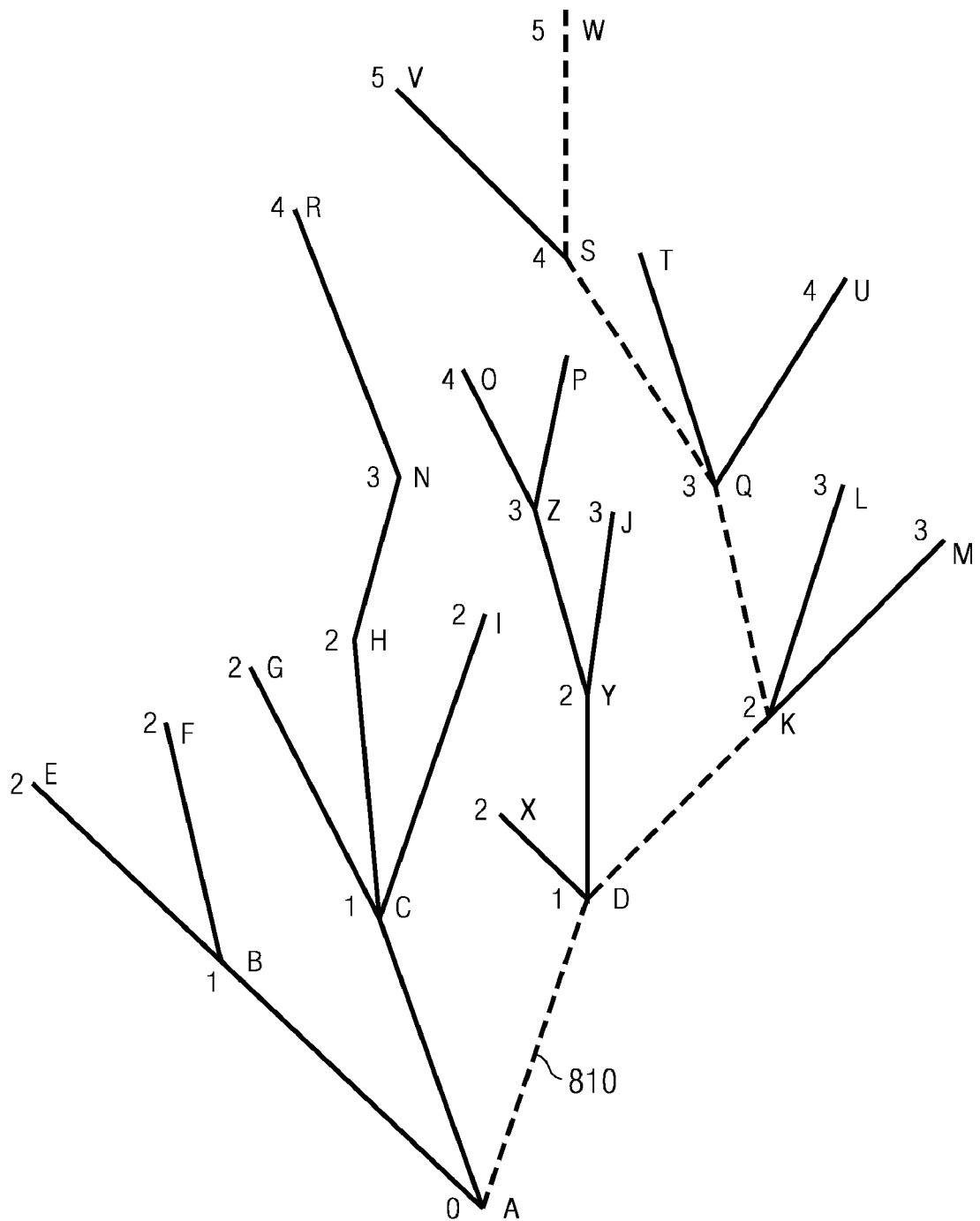
FIG. 8 illustrates an example of the overall concept of the mechanisms for supporting an arbitrary number of levels of nested virtualization in accordance with one illustrative embodiment.

FIG. 8 illustrates an example of the overall concept of the additional mechanisms for supporting an arbitrary number of levels of nested virtual machines in accordance with one illustrative embodiment. In a system where there are multiple levels of virtualization, there is generally one active tree which is illustrated by the dashed line 810 in FIG. 8. The dashed line 810 indicates the active portion of the tree, i.e. the currently active operating system, hypervisor, tables, etc.

In the depiction of FIG. 8, the numbers to the left of the interior vertices indicate the level of recursion and the capital letters to the right indicate the label of the corresponding vertex. For example, vertex H is at level 2. In FIG. 8, the hypervisor A, at level 0, is supporting three operating systems or hypervisors B, C, and D, each of which is at level 1. The OS or hypervisor at D is also supporting three hypervisors/operating systems, X, Y, and K, whereas the OS or hypervisor at B is only supporting 2, E and F. It can be seen that, in the depicted example, there are six systems at level 3, N, Z, J, Q, L and M.

Figure 9:
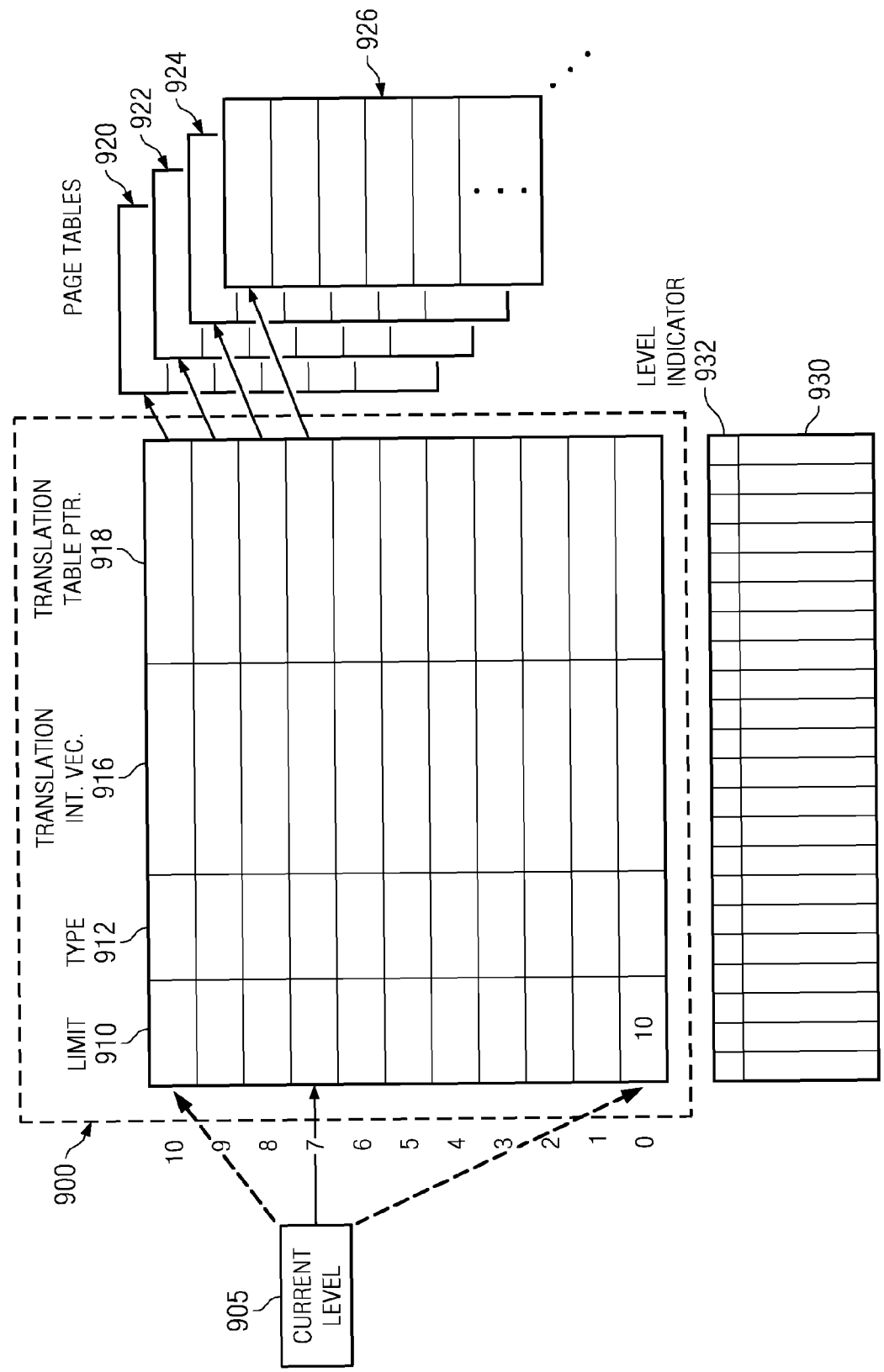
FIG. 9 illustrates a recursive logical partition real memory map mechanism for supporting an arbitrary number of levels of nested virtualization in accordance with one illustrative embodiment.

FIG. 9 illustrates hardware for providing an address translation mechanism to provide a recursive logical partition real memory map mechanism for supporting an arbitrary number of levels of nested virtualization in accordance with one illustrative embodiment. While the example shown in FIG. 9 is implemented in hardware, it should be appreciated that the mechanisms may also be implemented in software or a combination of hardware and software, depending upon what is desired by the user. For example, a system may be provided in which hardware mechanisms as previously described may be utilized to provide a single level of virtualization while additional levels of virtualization may be supported by implementation of the mechanisms in FIG. 9 in software (or additional hardware as depicted).

The recursive logical partition real memory map 900 of this illustrative embodiment may be utilized in place of the logical partition real memory map 790 and the associated interrupt vectors and table pointers 733, 731, 734, and 732 in the embodiment of FIG. 7. The main difference between LPRM 790 and RLPRM 900 is that LPRM 790 provides hardware support for one level of virtualization with a single page table structure while RLRPM 900 permits any number of levels of nested virtualization where each level can have a different page table structure.

In one illustrative embodiment, to make the hardware address translation mechanism recursive, and thereby support any number of levels of nested virtualization, a Recursive Logical Partition Real Memory (RLPRM) map table 900 is maintained in either the hardware or the software. Along with this table a new register (or pointer), referred to as the current level 905, is exploited by the address translation mechanism. The RLPRM map table 900, in one illustrative embodiment, keeps four items for each level of virtualization. These four items of information include the limit 910, the type 912, the translation interrupt vector 916, and the translation table pointer 918.

The limit 910 is a maximum number of virtualization levels above the current level supported by this entry in the RLPRM map table 900 and thus, the data processing system in which the RLPRM map table 900 is implemented. By convention the limit value at the lowest level in the table (Limit(0)) limits the total number of levels in the RLPRM map table 900. However, because it is desirable to have complete virtualization, this limit does not affect the values that higher levels can store in the RLPRM map table 900. This limit 910 does affect whether or not a higher level hypervisor, OS, or the like, can create another level of virtualization. It is possible for a higher level entity to restrict the number of levels of virtualization above it to be less than that allowed by Limit(0).

For example, referring to FIG. 8, if Limit(0)=10 as shown in FIG. 9, the hypervisor at node B could set its limit value to 2 while the hypervisor at node C has set its limit value to 3 and the hypervisor at node D has set its limit value to 15. This means that when the hypervisor at node B is running, there will be at most two levels of virtualization above it. When the hypervisor at node C is running, there will be at most three levels of virtualization above it. Now the hypervisor at level D has set a limit that is higher than what is allowed by Limit(0). The mathematics of the limit policy are that Limit(i)<=Limit(0)−i and, if Limit(i)>i+Limit(0), then the effective limit supported by the hardware is Limit(0)−i, where i represents the level in the LRPM table 900. In this case the real limit for D is 9 (10−1). This represents how many levels will be supported by the hardware. Anyone can add additional levels of virtualization through software. In the case where Limit(0)=0, there is no hardware support for virtualization.

The type 912 is a value indicating the type of page tables being used by the corresponding virtualization level. It should be appreciated that there may be different types of page tables used within the data processing system and each level of virtualization may utilize a different type of page table from that of other levels of virtualization in the data processing system. The translation table pointer 918 points to the OS page tables associated 920-926 with its entry. The translation interrupt vector 916 points to the code that handles a page fault for this entry. The current level 905 points to an entry in the RLPRM map table 900 and is the current level in the RLPRM table 900. In the example shown in FIG. 9, the RLPRM table 900 has eleven levels and is limited to eleven (By convention in this embodiment the limit 910 at level 0 limits the total number of levels of recursion irrespective of the limits set by higher levels in the table), although it should be appreciated that this is only an example and is not intended to state or imply any limitation with regard to the number of levels or limit on the number of levels that may be represented in the RLPRM table 900. For illustrative purposes in this embodiment we have indicated in FIG. 9 the level of the entries in the RLPRM table 900.

With reference again to FIG. 8, and with continued reference to FIG. 9, to provide a brief description of the current level 905, consider that when the hardware starts operating, the current level 905 is initialized to zero. There is only one level of software running in this example, e.g., Hypervisor A or "level A", in FIG. 8. The RLPRM table 900 entry, as a result, contains the following values for the example four items of information. The limit field 910 is set by Hypervisor A to an implementation specific value which, for purposes of this description, is assumed to be 10. This will limit the total number of levels in the table to eleven, this is ten recursive levels above the current level. The type field 912 specifies the type of page tables being used by level A. The translation interrupt vector 916 points to the translation interrupt handler in Hypervisor A. The translation table pointer 918 points to the translation tables being maintained by Hypervisor A.

In this example, a process for an OS or hypervisor in level A to transfer control to an OS or hypervisor in level D uses the following set of operations. The current level 905 is incremented and control is passed to the OS or hypervisor in level D (hereafter referred to only as "level D"). Level D fills in the information in the RLPRM table 900, i.e. the limit 910, type 912, translation vector 916, and translation table pointer 918. All of this information is filled in before any translation interrupts are handled. The current level 905 has been incremented as part of the mechanism of transferring control to a new level of virtualization. In addition to all the standard operations performed by an OS, the OS also completely sets up the address translation mechanism before interrupts are enabled. In this embodiment the current level is generally described as a counter. Those skilled in the art will realize that the system knows the base of the RLPRM 900 table and the length of each entry and thus, with a counter may generate pointers where required.

With reference to FIG. 9, the type field 912 informs the translation hardware what kind of page tables are pointed to by the translation table pointer 918. There may be many different mechanisms for maintaining page tables. That is, the page tables may be trees, hashes, or any other page table mechanism supported by the hardware. The limit field 910 sets the maximum depth of virtualization above the current level subject to some constraints. The limit field 910 at level zero sets the maximum depth of nested virtualization for this system. In FIG. 9 the maximum depth of nested virtualization for the system is 10. Each level above level zero is allowed to set its own limit. However, by convention in the preferred embodiment none of the levels above the root, level 0, can extend the number of levels of recursion allowed in the system. For example in the preferred embodiment, if the hypervisor running at level 8 can set is limit register to 7. However, any attempt by hypervisors or operating systems to extend the number of levels of virtualization beyond the limit set by level zero, in this illustration 10 additional for a total of eleven, would fail. This allows the same version of a hypervisor or OS to be running at multiple levels in the table. The hypervisor (or OS) running at any level can reduce the number levels of virtualization supported above it by setting it limit field to a number lower than that allowed by the limit field at level zero. In the example of FIG. 9, the hypervisor running at level 8 can reduce the number of levels of virtualization supported above it setting its limit register to zero or one. Any mechanism or none at all, can be used to limit the number of levels of recursion in a system.

The current level 905 is a value stored in a register that indicates the current level of nested virtualization. The current level 905 is always less than or equal to the limit set by level zero. This is indicated by the dotted lines pointing to the limits of the RLPRM map table 900.

In addition to the above, a translation cache 930 is provided. The translation cache 930 may be a TLB, ERAT, or any other appropriate mechanism. The translation cache 930 is augmented with a virtualization level indicator 932. Whenever a translation interrupt is generated because the address translation hardware does not know how to resolve an address to a system real address 240, as part of the address translation operation illustrated in FIG. 10 hereafter, an entry is made in the translation cache 930 which associates the virtual address with the system real address 240, the virtualization level 932 associated with that entry is also entered into the translation cache 930. This enables partial flushing of the translation cache 930 based on the current level 905. Whenever an instruction or event occurs that requires flushing of the translation cache 930, all entries with a level number equal to or greater than the current level 905 are flushed, i.e. invalidated.

Figure 10:
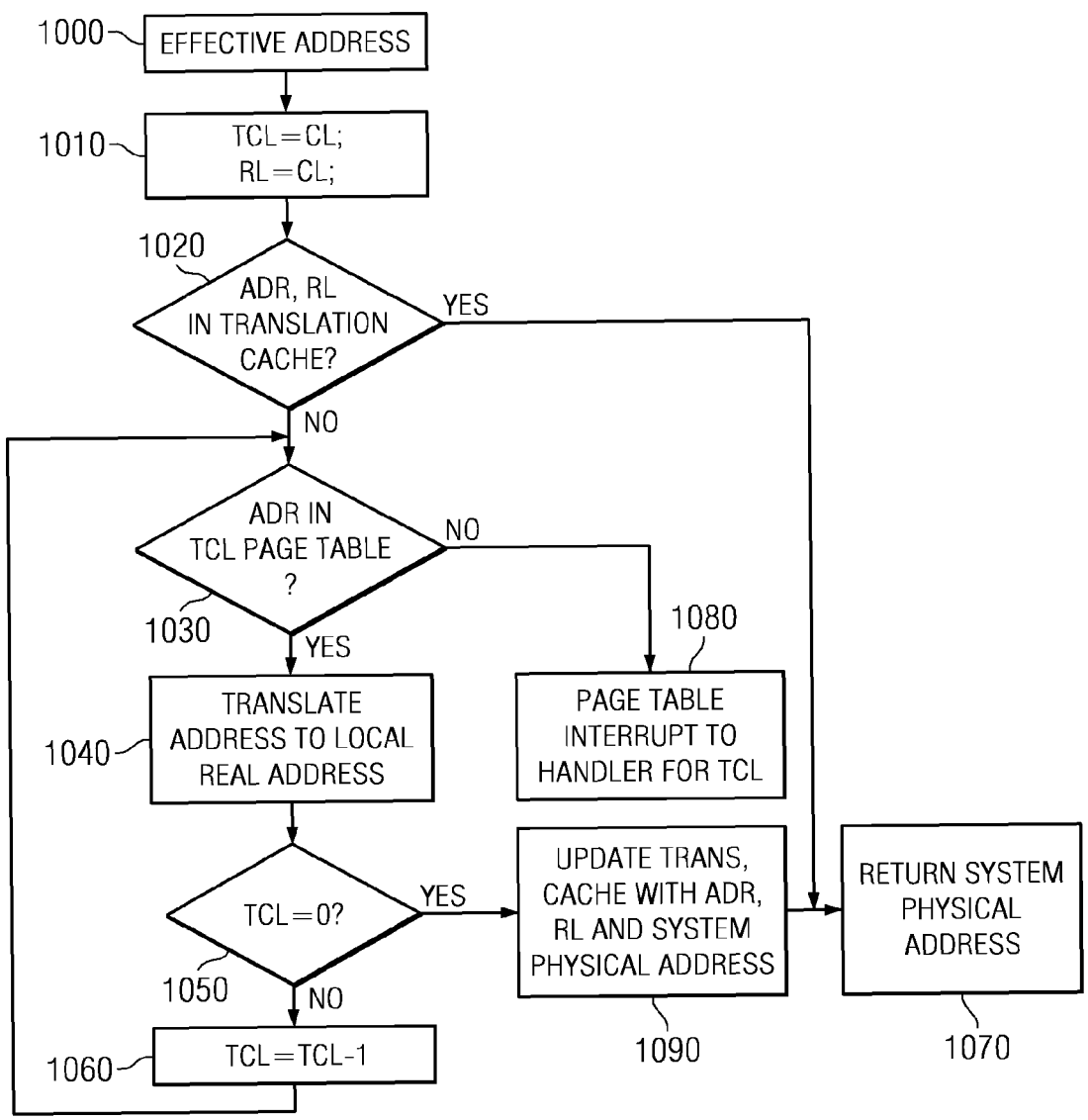
FIG. 10 is a high level overview of an address translation flow using the recursive logical partition real memory map table in accordance with one illustrative embodiment.

FIG. 10 is a high level overview of an address translation flow using the recursive logical partition real memory map table in accordance with one illustrative embodiment. As shown in FIG. 10, the address translation flow starts with receiving an effective address (ADR) for translation into a real address (step 1000). The address translation hardware sets the translation current level (TCL) and the requesting level (RL) (step 1010). The address translation hardware performs a lookup operation of the effective address (ADR) and a corresponding requesting level (RL) in the translation cache (step 1020). The RL is the level where the initial page fault was taken.

If the effective address is in the translation cache, the system physical address is returned (step 1070). If the effective address (ADR) is not in the translation cache, the address translation hardware checks to see if the effective address is in the page table for the TCL (step 1030). If the effective address is not in the page table pointed to by the TCL, the address translation hardware generates a page table interrupt to the interrupt handler pointed to by the TCL translation interrupt vector 916 in the RLPRM table 900 of FIG. 9 (step 1080). After the page table interrupt is resolved, address translation resumes from the interrupted instruction. If the address is in the TCL page table, it is translated to a local real address (step 1040).

The address translation hardware then checks to see if it has reached level zero (step 1050) of the RLPRM table 900. If it has not, the address translation hardware decrements the TCL (step 1060) and loops to step 1030 to check whether the effective address is in the TCL page table. If the TCL indicates that the address translation hardware has reached level zero of the RLPRM table 900 (step 1050), then the address translation hardware updates the translation cache with the effective address (ADR), the requesting level (RL), and the system physical address (step 1090). The address translation hardware then returns the system physical address (step 1070). It is worth noting that when the translation operation reaches level zero, the last local real address that was generated is the system physical address.

The loop, comprising steps 1030, 1040, 1050, and 1060, will continue until the system physical address is found and the translation cache is updated or a page table error is found and the appropriate interrupt handler has been called to update the page table. Whenever a page table interrupt is resolved, translation starts over with the instruction that first caused the interrupt. Unless an error occurs, this algorithm uses TCL to increment through the RLPRM table 900, until the system physical address has been found.

It is important to note some of the other features of the illustrative embodiments. For example, at any level, such as level D in FIG. 8, the hypervisor may decide that it wants to, or needs to, change the active OS/hypervisor above it (i.e. at a higher level). The hypervisor making the change is responsible for saving all of the registers from the recursive logical partition real memory (RLPRM) map table for all levels above it in a portion of memory (or a set of registers) from which the values may be restored. Note that the maximum number of levels that must be saved is equal to the limit 910 set by the current hypervisor. As an optimization, the hypervisor may keep track of the number of levels above it, but this is not required. In the example of FIG. 8, assuming hypervisor D is performing the change, the active hypervisor is indicated by the dashed line going through node K, this includes levels 2, 3, 4, and 5. Next the hypervisor making the change purges the translation cache, in this example the translation cache would be purged of all entries associated with levels two through five, and restores all the registers for the recursive logical partition real memory (RLPRM) map table associated with the task, such as Y-Z-P, that the hypervisor wants or needs to activate. For this illustration Y-Z-P is the active thread that is being switched to by hypervisor D.

At any given level, the hypervisor or OS that is running has no knowledge of the number of levels below it. The hypervisor at any given time knows the active thread above it because the current level is set to the interrupted task. The hypervisor (or OS) knows all entries in the RLPRM table 900 corresponding to levels running above it. Each hypervisor has the perspective that it is running on the bare hardware.

In addition, all instructions that cause a purge of the translation cache are modified to only purge entries for the current level and all higher levels. Thus, the translation cache need not be completely purged in response to a switch of the OS or hypervisor context. This allows lower level OS/hypervisors to maintain their translations in the translation cache.

Thus, the illustrative embodiments provide mechanisms for performing assignment of primary fast real memory to logical partitions and enforcement of real memory separation between partitions while allowing authorized sharing of memory. Moreover, the illustrative embodiments provide a recursive architecture for a hypervisor real memory map that is used directly by the hardware so that multiple levels of OS's and hypervisors are supported by the mechanisms of the illustrative embodiments. The recursive architecture avoids the OS changes and calls to the hypervisor typically required by paravirtualization and further reduces the size of the hypervisor core function whose correctness determines the security of real memory separation of partitions.

In addition to the mechanisms described above, additional optimizations to the recursive logical partition real memory map mechanisms may be utilized in one or more embodiments of the present invention. For example, each entry in the translation cache may be labeled with the level from the recursive logical partition real memory map, such as shown in FIG. 8 for example. Once this is done, purge translation cache operations may only purge entries from the current level and higher on the active path through the virtual memory system. Entries in the translation cache may still be aged normally. Consequently, entries for non active paths are more likely to be overwritten depending on the replacement algorithm.

A second optimization may include storing intermediate values from the translation in the translation cache either with software assist or directly in the hardware. This speeds up the overall translation, if done properly.

The recursive mechanisms of the illustrative embodiments make two fundamental non-obvious extensions of the single level logical partition real memory map mechanism. First, the hardware mechanism is made recursive and thus, capable of handling multiple levels of logical partition real memory map tables. The second extension is that at each level the type of page table, hash, tree, TLB, ERAT or other, is specified by a field in the logical partition real memory map table entry for the current level. This creates hardware support for multiple levels of virtualization that allows each virtual system to have a different type of page table (up to the limits supported by the hardware) and to manage those page tables directly. The number of different types is fixed by the hardware implementation. The easiest way to conceptualize this is as a tree of virtual memory systems were only one path between the root and a leaf is active at any one time, as shown in FIG. 8 by the dashed line. Every node in the tree controls all virtual memory systems between it and its leaves. Any active node that wants to change from one path below it to another is responsible for saving all of the pointers for the active path before switching to the new path.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accessing memory based on an address submitted by a process of a currently active logical partition, comprising:
   receiving a first address based on an address submitted from the process of the currently active logical partition;
   translating the first address into a second address using a recursive logical partition real memory (RLPRM) map data structure for the currently active logical partition; and
   accessing the memory using the second address, wherein the RLPRM map data structure provides a plurality of translation table pointers, each translation table pointer pointing to a separate page table for a separate level of virtualization in the data processing system, the data processing system supporting multiple levels of virtualization, wherein the data processing system comprises a translation cache, and wherein entries in the translation cache include a virtualization level indicator.

2. The method of claim 1, wherein translating the first address into the second address using the RLPRM map data structure comprises:
using a value stored in a current level register to identify an entry, in the RLPRM map data structure, for a current virtualization level of the current active logical partition;
using the entry in the RLPRM map data structure to identify a page table corresponding to the current virtualization level based on a translation table pointer stored in the entry; and
using the page table identified based on the entry in the RLPRM map data structure to translate the first address into the second address.

3. The method of claim 1, wherein if an instruction or event occurs requiring flushing of the translation cache, the translation cache is partially flushed based on the virtualization level indicators of the entries in the translation cache.

4. The method of claim 3, wherein partially flushing the translation cache based on the virtualization level indicators comprises flushing entries in the translation cache whose corresponding virtualization level indicators are the same or higher than the value stored in the current level register.

5. The method of claim 1, wherein the RLPRM map data structure stores an entry for each level of virtualization in the multiple levels of virtualization, and wherein the entry comprises at least one of a limit value, a type value, a translation interrupt vector, or a corresponding translation table pointer in the plurality of translation table pointers.

6. The method of claim 1, wherein at least two levels of virtualization in the multiple levels of virtualization utilize different types of page tables.

7. The method of claim 1, wherein:
the address submitted from the process of the currently active logical partition is an effective address,
the effective address is translated into a first partition real address,
the first partition real address is translated into the first address, wherein the first address is a second partition real address, and
the second address is a system real address.

8. The method of claim 1, wherein the RLPRM map data structure is maintained in one of the hardware of the data processing system or software executing on the data processing system.

9. A method, in a data processing system, for accessing submitted by a process of a currently active logical partition, comprising:
receiving a first address based on an address submitted from the process of the currently active logical partition;
translating the first address into a second address using a recursive logical partition real memory (RLPRM) map data structure for the currently active logical partition; and
accessing the memory using the second address, wherein the RLPRM map data structure provides a plurality of translation table pointers, each translation table pointer pointing to a separate page table for a separate level of virtualization in the data processing system, the data processing system supporting multiple levels of virtualization, wherein:

the RLPRM map data structure stores an entry for each level of virtualization in the multiple levels of virtualization,
the entry comprises at least one of a limit value, a type value, a translation interrupt vector, or a corresponding translation table pointer in the plurality of translation table pointers,
the translation interrupt vector points to code that handles a page fault for a level of virtualization corresponding to the entry,
the limit value identifies a maximum number of levels of virtualization supported by the data processing system, and
the type value identifies a type of page table being used by the level of virtualization corresponding to the entry.

10. An apparatus, comprising:
a processor; and
a memory coupled to the processor, wherein the processor operates to:
receive a first address based on an address submitted from a process of a currently active logical partition;
translate the first address into a second address using a recursive logical partition real memory (RLPRM) map data structure for the currently active logical partition; and
access the memory using the second address, wherein the RLPRM map data structure provides a plurality of translation table pointers, each translation table pointer pointing to a separate page table for a separate level of virtualization in the apparatus, the apparatus supporting multiple levels of virtualization, wherein the apparatus further comprises a translation cache, and wherein entries in the translation cache include a virtualization level indicator.

11. The apparatus of claim 10, wherein the processor translates the first address into the second address using the RLPRM map data structure by:
using a value stored in a current level register to identify an entry, in the RLPRM map data structure, for a current virtualization level of the current active logical partition;
using the entry in the RLPRM map data structure to identify a page table corresponding to the current virtualization level based on a translation table pointer stored in the entry; and
using the page table identified based on the entry in the RLPRM map data structure to translate the first address into the second address.

12. The apparatus of claim 10, wherein if an instruction or event occurs requiring flushing of the translation cache, the processor partially flushes the translation cache based on the virtualization level indicators of the entries in the translation cache.

13. The apparatus of claim 12, wherein partially flushing the translation cache based on the virtualization level indicators comprises flushing entries in the translation cache whose corresponding virtualization level indicators are the same or higher than the value stored in the current level register.

14. The apparatus of claim 10, wherein the RLPRM map data structure stores an entry for each level of virtualization in the multiple levels of virtualization, and wherein the entry comprises at least one of a limit value, a type value, a translation interrupt vector, or a corresponding translation table pointer in the plurality of translation table pointers.

15. The apparatus of claim 10, wherein at least two levels of virtualization in the multiple levels of virtualization utilize different types of page tables.

16. The apparatus of claim 10, wherein:
the address submitted from the process of the currently active logical partition is an effective address,
the effective address is translated into a first partition real address,
the first partition real address is translated into the first address, wherein the first address is a second partition real address, and
the second address is a system real address.

17. An apparatus, comprising:
a processor; and
a memory coupled to the processor, wherein the processor operates to:
receive a first address based on an address submitted from a process of a currently active logical partition;
translate the first address into a second address using a recursive logical partition real memory (RLPRM) map data structure for the currently active logical partition; and
access the memory using the second address, wherein the RLPRM map data structure provides a plurality of translation table pointers, each translation table pointer pointing to a separate page table for a separate level of virtualization in the apparatus, the apparatus supporting multiple levels of virtualization, wherein:
the RLPRM map data structure stores an entry for each level of virtualization in the multiple levels of virtualization,
the entry comprises at least one of a limit value, a type value, a translation interrupt vector, or a corresponding the plurality of translation table pointers,
the translation interrupt vector points to code that handles a page fault for a level of virtualization corresponding to the entry,
the limit value identifies a maximum number of levels of virtualization supported by the data processing system, and
the type value identifies a type of page table being used by the level of virtualization corresponding to the entry.

18. A computer program product comprising a computer recordable storage medium having a computer readable program recorded thereon, wherein the computer readable program, when executed on a computing device, causes the computing device to:
receive a first address based on an address submitted from a process of a currently active logical partition;
translate the first address into a second address using a recursive logical partition real memory (RLPRM) map data structure for the currently active logical partition; and
access the memory using the second address, wherein the RLPRM map data structure provides a plurality of translation table pointers, each translation table pointer pointing to a separate page table for a separate level of virtualization in the computing device, the computing device supporting multiple levels of virtualization, wherein the computing device comprises a translation cache, and wherein entries in the translation cache include a virtualization level indicator.

* * * * *